United States Patent
Reggiardo

(10) Patent No.: US 6,314,801 B1
(45) Date of Patent: Nov. 13, 2001

(54) ENGINE ECONOMIZING VEHICLE SHIFTING SYSTEM AND METHOD

(76) Inventor: Luis Alberto Garcia Reggiardo, Travessa Padre Eutiquio 1572, Ap. 1402, Batista Campos, Belem, Para (BR), 66026-230

( * ) Notice: Subject to any disclaimer, the term of this patent is extended or adjusted under 35 U.S.C. 154(b) by 0 days.

(21) Appl. No.: 09/312,397

(22) Filed: May 14, 1999

(51) Int. Cl.[7] .................. G01M 15/00; G01L 5/28
(52) U.S. Cl. ................. 73/112; 73/118.1; 73/129
(58) Field of Search .................. 73/129, 118.1, 73/112, 116; 74/866, 846

(56) References Cited

U.S. PATENT DOCUMENTS

| | | |
|---|---|---|
| 3,628,642 | 12/1971 | Ravenel . |
| 4,039,061 * | 8/1977 | Pruvot et al. ............... 74/866 |
| 4,696,380 * | 9/1987 | Kita ............................ 192/4 A |
| 5,105,923 * | 4/1992 | Iizuka ........................... 74/846 |
| 5,154,267 | 10/1992 | Watts . |
| 5,203,235 | 4/1993 | Iizuka . |
| 6,039,674 * | 3/2000 | Dourra et al. ............... 73/49.3 |
| 6,092,021 * | 7/2000 | Ehlbeck et al. ............. 73/117.3 |

* cited by examiner

Primary Examiner—Benjamin R. Fuller
Assistant Examiner—Maurice Stevens
(74) Attorney, Agent, or Firm—Malloy & Malloy, P.A.

(57) ABSTRACT

A system and associated method of economizing engine operation by automatically shifting the transmission of a motorized vehicle into a neutral gear from a drive gear when specific, predetermined conditions of the vehicle concurrently exist. A first sensing assembly is designed and structured to monitor and determine the engine speed of the vehicle in terms of RPM. A second sensing assembly is designed and structured to monitor and determine the braking condition of the vehicle at least to the extent that the brakes are applied. A transmission control assembly is operatively connected to the transmission of the vehicle and is-structured to shift the vehicle transmission from a lower drive gear to the neutral gear when the first predetermined condition relating to engine speed of the vehicle and the second predetermined condition relating to the braking mode of the vehicle concurrently exist. Absence of either of the aforementioned of predetermined conditions will prevent the automatic shifting of the transmission into the neutral gear. In addition, once the transmission of the vehicle has been automatically shifted into the neutral gear it will automatically shift back into a low drive gear when either or both of the predetermined first and second conditions fail to concurrently exist. An activation assembly as well as safety measures are incorporated to allow for selective, manual activation/de-activation and automatic de-activation upon the occurrence of certain events and/or driving conditions.

13 Claims, 2 Drawing Sheets

ENGINE ECONOMIZING VEHICLE SHIFTING SYSTEM AND METHOD

BACKGROUND OF THE INVENTION

1. Field of the Invention

This invention relates to a system and accompanying method for economizing the operation of a vehicle's engine by activating the transmission thereof and automatically shifting the transmission from a low drive gear to a neutral gear when driving engagement of the gears is not necessary, but operation of the engine is still maintained, thereby reducing wear on the engine and gears, conserving fuel and energy, reducing the amount of pollution generated by the vehicle's engine which is exhausted into the atmosphere and reducing wear on the braking system as it does not have to overcome an engines driving force to keep the vehicle in a stopped orientation.

2. Description of the Related Art

In modern day travel, motorized vehicles such as automobiles, trucks, etc. typically incorporate the use of an automatic transmission to regulate engine operation. Specifically, automatic transmissions of the type referred to are activated or controlled by mechanical, electronic and/or computerized control systems which sense the various conditions of the vehicle, including but not limited to vehicle speed, for transferring the gear train automatically between a plurality of drive gears. The number of drive gears in modern day automatic transmissions of course may vary typically from two drive gears to four drive gears.

In addition to the drive gears, automatic transmissions also include a reverse gear and a neutral gear. However, the reverse and neutral gears are configured such that they can only be obtained by manual activation of the transmission by the driver or operator of the vehicle. As can be appreciated, the positioning of an automatic transmission into the reverse gear is restricted to manual control for safety reasons. Specifically, under no practical circumstances would an automatic transmission be designed for automatic shifting into a reverse gear during the operation of the motorized vehicle in a forward direction. Such an inadvertent shifting and direction change into reverse at the wrong time could cause severe damage to or destruction of the transmission, as well as threaten the safety of the passengers of the vehicle.

There are apparently similar beliefs concerning the automatic shifting of a transmission into the neutral gear. However, as will be pointed out in greater detail hereinafter, such beliefs are now considered to be completely false. While the automatic down shifting of a vehicle transmission through the lower drive gears and into the neutral gear is virtually unheard of, prior art attempts have been made to regulate the automatic down shifting of the gear train of a vehicle transmission. Previously known control systems, while possibly varying in design and operative features, are normally directed to taking advantages of the well known "braking effect" of the engine occurring when the transmission of a vehicle is down shifted and the speed of the vehicle is greater than the conventional speed at which the automatic transmission would normally accomplish a down shifting. The vehicle engine's "braking effect" is commonly used by an operator of an automobile having a multi-speed, manual transmission to slow the vehicle without applying the brakes thereof. Therefore, while conventional control systems may be designed to interact with known vehicle automatic transmission systems and may incorporate a variety of different features and/or operative characteristics, none of the known transmission control systems include the automatic down shifting through one or more drive gears and into a neutral gear in an automatic fashion based on specific operating conditions of the vehicle.

Indeed, it would be extremely beneficial to devise and incorporate a control system designed to automatically down shift a vehicle transmission into the neutral gear. For example, even though vast improvements have been made in the reduction of pollution generated by the operation of motor vehicles incorporating gasoline powered internal combustion engines, pollution still remains a major problem and a serious threat to the world's environment. There are, however, still numerous and prolonged periods during the operation of a motor vehicle wherein the vehicle travels at a relatively low speed resulting in the vehicle's engine operating at significantly low R.P.M. Under such operating conditions, it is also common for the operator of the vehicle to continuously and/or repeatedly activate the braking system of the vehicle by engaging the foot operated brake pedal in the conventional fashion. During such periods, the automatic transmission of the vehicle is maintained in the lower ranges of the gear train of the automatic transmission. During such "low demand" operating conditions of the vehicle, it would be beneficial to provide a system which can automatically shift the transmission into the neutral gear as that would greatly reduce the load placed on the engine of the vehicle, and proportionally reduce the fuel consumed and the pollution generated. Operating conditions of the vehicles of the type set forth above typically occur when the operator is traveling in extremely heavy "bumper to bumper" traffic or when the vehicle is designed or intended for use as "pick-up and delivery" vehicle, wherein numerous stops and/or unusually slow travel of the vehicle is required.

Therefore, there is a need in the industry and in the design and manufacture of motorized vehicles, particularly automobiles, buses and trucks, for an improved control system and associated method for economizing the vehicle's engine operation and minimizing wear on the transmission. Such an improved system and method should be structured so as to operate only when the vehicle is to be stopped so as to avoid possible safety hazards associated with required acceleration, and should operate only under particular conditions, such as when engine operation economization can be safely and effectively taken advantage of. Moreover, an improved system should also preferably be adaptable for use with existing vehicle engine designs without detracting from the normal operation thereof or requiring significant modifications.

SUMMARY OF THE INVENTION

The present invention is directed towards a system and an associated method for economizing the operation of a vehicles engine; reducing pollution and which also helps reduce wear on engine components and an associated braking system. Specifically, the system of the present invention is structured to automatically shift the automatic transmission of a conventional motorized vehicle from a low drive gear to the neutral gear when certain predetermined conditions exist. First, assuming the manual shift lever of the vehicle is in the drive position (D) and once operational conditions of the vehicle, including the vehicle's engine speed being at or below a predetermined RPM and the braking system of the vehicle being at least partially activated are achieved, the various operative components of the system of the present invention will automatically activate the gear train of the automatic transmission and cause a shifting from a low drive gear into the neutral gear. It is to emphasized, however, that the aforementioned predetermined conditions relating to engine speed and activation of the braking system must concurrently exist. The absence of either of these predetermined conditions will cause the vehicle's automatic transmission to be maintained in its normal operating and shifting sequence. In addition, the system and attendant method of the present invention is also specifically designed to activate the gear train of the automatic transmission to "automatically" shift back to preferably the lower most drive gear, from the neutral gear, when either of the aforementioned predetermined conditions relating to engine speed and braking conditions do not concurrently exist. Of course, the automatic shifting from the neutral gear to the lower most drive gear preferably only occurs when the drive train of the vehicle's automatic transmission was placed in the neutral gear "automatically" by the present system without the manual intervention or shifting by the operator.

A further feature of both the system and attendant method of the present invention is preferably the continuous monitoring of both the engine speed as well as the braking mode of the vehicle when the system is activated. Such continuous monitoring is designed to determine whether the aforementioned predetermined conditions, defining a first criteria relating to engine speed and a second criteria preferably relating to braking mode, concurrently exist. For example, under certain driving conditions, such as but not limited to, congested traffic resulting in frequent stop and go driving, the braking system of the automobile is repeatedly and continuously engaged and disengaged by foot pressure exerted on and released from the brake pedal. However, depending upon the speed of the traffic flow, the engine speed of the vehicle may or may not be within the predetermined conditions of the aforementioned first criteria to the extent of being greater than a predetermined and preset RPM. Under such operational characteristics of the vehicle the predetermined conditions of a second criteria, in terms of engaging the braking system of the vehicle, may repetitively exist. However, since the RPM of the engine is always above a preset RPM level, which defines the predetermined conditions of the first criteria, the drive train of the vehicle's automatic transmission will not be allowed to automatically shift from a lower drive gear into the neutral gear.

Therefore, the system of the present invention is designed and structured to activate the gear train of the vehicle's multi-speed, automatic transmission to automatically shift from a lower most drive gear to the neutral gear only when the predetermined conditions of both the first criteria, relating to engine speed, and the second criteria, relating preferably to the braking mode, concurrently exist. In addition, the system of the present invention is designed to activate the drive train of the automatic transmission so as to automatically shift from the neutral gear to the lower drive gear when either of the aforementioned predetermined conditions of the first or second criteria are no longer met.

Another feature of the system and attendant method of the present invention is the ability to selectively and manually adjust and thereby regulate the predetermined conditions associated with each of the first criteria and second criteria. More specifically, dependent upon the intended use of the vehicle in which the system and attendant method of the present invention is incorporated, it may be desirable for an operator to vary the specific RPM at which the system is activated. Similarly, and as described in greater detail hereinafter the monitoring or sensing of the activation of the braking system of the vehicle can be accomplished in a variety of ways, including but not limited to, determining the physical position of the brake pedal or alternately, determining a sufficient increase in the pressure of the brake fluid. Yet another means of sensing and/or determining the activation of the braking system of the vehicle would be to sense and determine the physical pressure exerted on the brake pedal by the foot of the operator.

It is also to be understood that the system of the present invention may be manually activated or de-activated, since in some conditions it may not be convenient or appropriate to allow the automatic shifting of the gear train of the vehicle's automatic transmission into the neutral gear from a lower most drive gear. In addition, the system may incorporate certain safety measures which automatically de-activates the system, such as when the driver deliberately or inadvertently exerts force on the gear shift lever, which may force the transmission into another gear, other than the intended drive gear. Also, the system will be de-activated when encountering relatively unusual driving conditions, such as when climbing up or descending from a hill. Under such conditions the system would be de-activated automatically rather than result in a shifting of the transmission into the neutral gear, even if the is predetermined conditions of the first and second criteria are met.

Therefore, it is an object of the present invention to provide a system and an attendant method to be incorporated in conventional motorized vehicles, such as automobiles, trucks, buses etc., which causes the automatic activation of the gear train of the vehicle's multi-speed, automatic transmission to shift from a lower drive gear to the neutral gear when predetermined conditions relating to the operational characteristics of the vehicle concurrently exist, thereby minimizing the work that must be performed by the engine during those periods.

It is also an object of the present invention to provide a system which limits the amount of wear on a vehicles braking system by minimizing the counter-braking force exerted on the braking system even when the vehicle is stopped.

Another object of the present invention is to minimize the wear exerted on a vehicles drive train while it is stopped under a braking force.

Also an object of the present invention is to minimize fuel consumption and pollution generation when the vehicle is stopped under a braking force due to the economization of the engine operation.

Another object of the present invention is to incorporate a system and method in association with a multi-speed, automatic transmission of a motorized vehicle designed to automatically shift the transmission from a lower drive gear to the neutral gear when certain predetermined conditions concurrently exist, and further which serves to automatically shift the transmission from the neutral gear back to a lower drive gear when certain, predetermined conditions of the vehicle do not concurrently exist.

Yet another object of the present invention is to provide a system and attendant method for the automatic shifting of a multi-speed, automatic transmission of a motorized vehicle between a drive gear and a neutral gear, without the manual shifting of the transmission by an operator, when certain predetermined operative conditions of the vehicle concurrently exist.

Still another object of the present invention is to provide a system and attendant method causing the automatic shifting of a motorized vehicle's multi-speed automatic transmission during the concurrent existence of certain predetermined conditions associated with the engine speed and braking mode of the vehicle, wherein the parameters of such predetermined conditions are manually adjustable.

It is also an object of the present invention to provide a system an attendant method which provides for automatically shifting a multi-speed automatic transmission of a motorized vehicle between a drive gear and a neutral gear under certain driving conditions and further wherein an operator may select to manually activate or deactivate the system dependent on the driving conditions.

It is yet another object of the present invention to provide an activation assembly for the manual, selective on/off activation/de-activation of the system and also provide an auxiliary activation assembly structured to sense and/or determine certain events and/or driving conditions for the safe, automatic de-activation of the system without the operator or occupant manually operating the on/off switch.

These and other objects, features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENTS

As shown in the accompanying Figures, the present invention is directed to a system and attendant method designed to economize the operation of a vehicle's engine and reduce wear on various operative components of the vehicle associated therewith. Specifically, the present system is structured to selectively activate the gear train of a conventional, multi-speed, automatic transmission of a motorized vehicle so as to automatically shift it from a low drive gear to the neutral gear, without the manual intervention of the operator, when certain predetermined operating conditions of the vehicle concurrently exist. In addition, the system and method of the present invention will further cause the gear train of the vehicle's automatic transmission to shift back from the neutral gear to the low drive gear when the aforementioned predetermined operative conditions of the vehicle do not concurrently exist. It is emphasized that for purposes of safety and to assure the complete control of the vehicle during its operation by an operator, the system of the present invention is specifically designed and structured to prevent the automatic shifting of the vehicle's transmission from the neutral gear back to a lower drive gear when the vehicle's transmission was manually placed into the neutral gear by the operator rather than "automatically" by the operation of the system of the present invention. Other safety provisions and features are provided and relate to the manual activation/de-activation of the system, inadvertent movement of the shift lever and climbing or descending travel of the vehicle and will be discussed in greater detail hereinafter.

Figure 1:
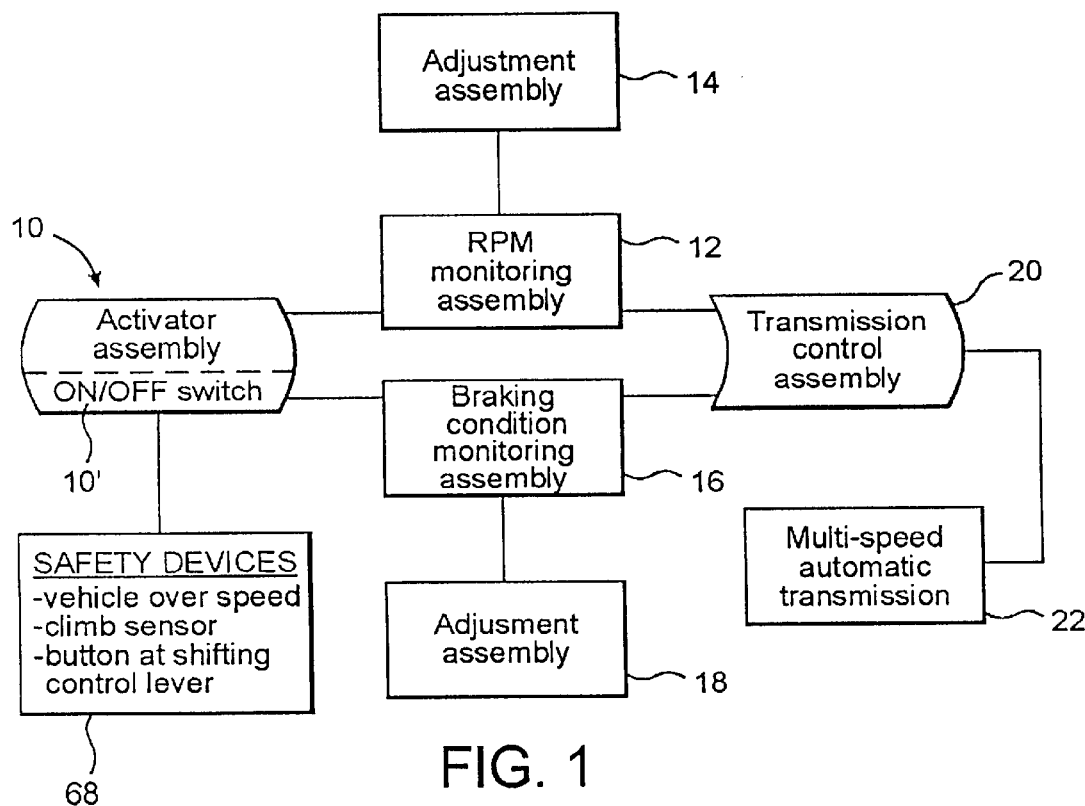
FIG. 1 is a schematic representation of certain operative components of the system of the present invention.

With reference to the accompanying Figures, the system of the present invention includes the various, operative components schematically represented in FIG. 1 and includes and activation assembly generally indicated as 10. The activation assembly 10 as well as the remaining components of the system of the present invention may be powered directly from a conventional battery or other electrical or mechanical power source found in the vehicle. Further, the activation assembly 10, among other applicable electronic circuitry, preferably includes a simple, conventionally structured on/off switch 10' which is conveniently disposed within the vehicle compartment in easy access to the operator of the vehicle. Dependent upon current driving conditions, as set forth above, it may be advantageous to activate or deactivate the system by manual operation of the on/off switch 10'. For example in heavy stop and go traffic a user may elect to de-activate the system to avoid repeated, frequent activation and de-activation thereof.

The system as represented in FIG. 1 further comprises an engine speed monitoring/sensing assembly 12. This engine speed monitoring assembly 12 may take on a variety of operative and structural configurations including a computer control associated with an existing tachometer or speedometer of the vehicle and structured to elicit preferably continuous readings therefrom regarding the engine speed. Although the engine speed aspect monitored by the monitoring assembly 12 may be associated with an actual speed of the vehicle, in the preferred embodiment the monitoring assembly 12 is structured to continuously monitor as well as sense and determine the specific RPM at which the vehicle engine is operating. Of course a combination of monitoring the vehicle's physical speed and RPM could be utilized if greater indicators are desired.

Additionally, a further feature of the present invention is the provision of an adjustment assembly 14 wherein the monitor/sensor 12 for the engine speed may be selectively adjusted and/or regulated, preferably manually by the operator of the vehicle, but also possibly as a factory installed setting that corresponds to the vehicle on which it will be used. The system of the present invention may therefore be selectively adapted to specific driving conditions or to regulate the operation of the subject system to the particular intended utilization of a vehicle, such as when the subject system is incorporated in a truck or like vehicle designed for deliveries, frequent pick-ups, etc. Also, as can be anticipated, some vehicles will tend to idle at higher RPMs than others, and as a result a pre-set setting may not be activated even when the vehicle is stopped.

As also shown in FIG. 1, the system of the present invention preferably comprises a monitor/sensor 16 specifically designed and structured to monitor and sense the braking conditions of the vehicle. In addition, and as with the monitor/sensor 12 associated with the engine speed, the braking mode monitor/sensor 16 may include an adjustment assembly 18 selectively adjustable by the operator or other maintenance personnel. The specific, predetermined conditions of the vehicle's braking system which trigger the present system are therefore adjustable along with the predetermined conditions of the engine speed so as to arrive at the optimum predetermined conditions for an individual vehicle which must concurrently exist to activate the system of the present invention. Alternate preferred embodiments of the braking mode monitor/sensor 16 will be described in greater detail hereinafter with reference to FIGS. 2 and 3.

A transmission control assembly 20 is designed and structured to be directly responsive to the output of the engine speed monitor/sensor 12 and the braking condition monitor/sensor 16 and/or directly responsive to activating signals generated thereby. The specific structure of the transmission control assembly may of course vary, but by way of example may include one or more hydraulic, pneumatic and/or solenoid type structures which serve to directly regulate shifting control of the gear train associated with a multi-speed automatic transmission 22 of the vehicle. Also, it may be preferred that the existing automatic transmission of the vehicle, which normally shifts the vehicle between gears, also shifts the transmission to the neutral gear in the same manner, but responsive to the system of the present invention. Furthermore, as computer controls become increasingly sophisticated, the transmission control assembly 20 of the present invention could be integrated as a supplemental programming on the existing automatic transmission controls of the vehicle, with the required parameters of the present invention being applied within the programmed nature of the transmission control assembly 20. As such, it should be apparent that numerous structural and operative configurations may define the transmission control assembly 20 which is specifically designed to cause the "automatic shifting" of the gear train of the automatic transmission 22 from a lower drive gear to the neutral gear and from the neutral gear to a lower drive gear, depending upon the concurrent existence or non-existence of the aforementioned predetermined conditions associated with the engine speed and the braking condition of the vehicle.

Figure 2:
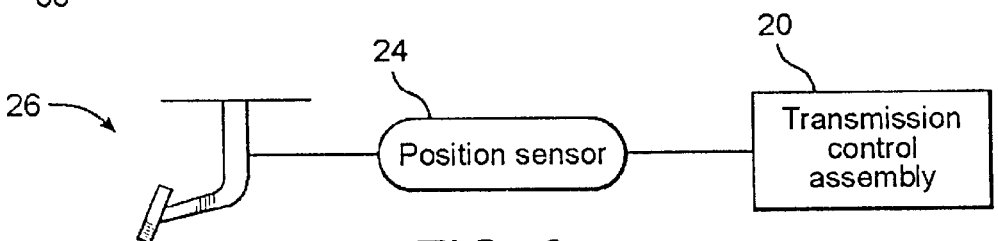
FIG. 2 is a schematic representation of one preferred embodiment of the monitoring and/or sensing components of the system of the present invention associated with the braking mode.

With regard to FIG. 2 one preferred embodiment of the present invention relating to the monitoring/sensing of the braking condition of the vehicle includes a position sensor 24 associated with the brake pedal generally indicated as 26 and structured to continuously monitor, sense and thereby determine the position of the brake pedal 26 both during activation and deactivation of the braking system. In the conventional fashion, the braking system of the vehicle in which the system of the present invention is incorporated is activated when the operator engages the brake pedal 26 with a foot and exerts sufficient force thereon to either cause a deceleration or complete stopping of the vehicle. The position sensor 24 is located in close proximity and/or actual attachment to the brake pedal 26 such that when the brake pedal reaches a certain "depressed" position below a predetermined point due to the force exerted thereon by the foot of the operator, the position sensor 24 will recognize that the vehicle is decelerating to the extent of meeting the aforementioned certain predetermined conditions associated with the braking condition of the vehicle. A sufficient criteria for generating an activating signal to the transmission control assembly 20 is therefore established. It is noted that the position sensor 24 may include a monitor which actually senses movement of the pedal below a predetermined height, or can include an actual switch which preferably does not restrict the normal depression of the pedal, but which is triggered while the height of the pedal is below a certain point. Naturally, the predetermined height will depend upon the normal spacing between the brake pedal and an underlying floor of the vehicle when the pedal is fully depressed and/or when the pedal is sufficiently depressed to cause the vehicle to stop under the braking force. A typical predetermined height of the brake pedal 26 may include a range of 2 to 6 inches and a depression of the brake pedal and the resulting movement thereof in the range of ⅛ inch to 6 inches may be sufficient to activate position sensor 24. Further, a range of movement of the brake pedal 26 will preferably be pre-set such that a tapping or slight depression of the brake pedal to cause mere slowing of the vehicle may not be sufficient to meet this required criteria. Again it is to be emphasized that the transmission control assembly 20 is specifically designed and structured to cause the gear train of the automatic transmission 22 to automatically shift from a lower drive gear to the neutral gear only when both predetermined conditions and accordingly a first and second criteria associated with the engine speed and the braking condition of the vehicle respectively, concurrently exist.

Figure 3:
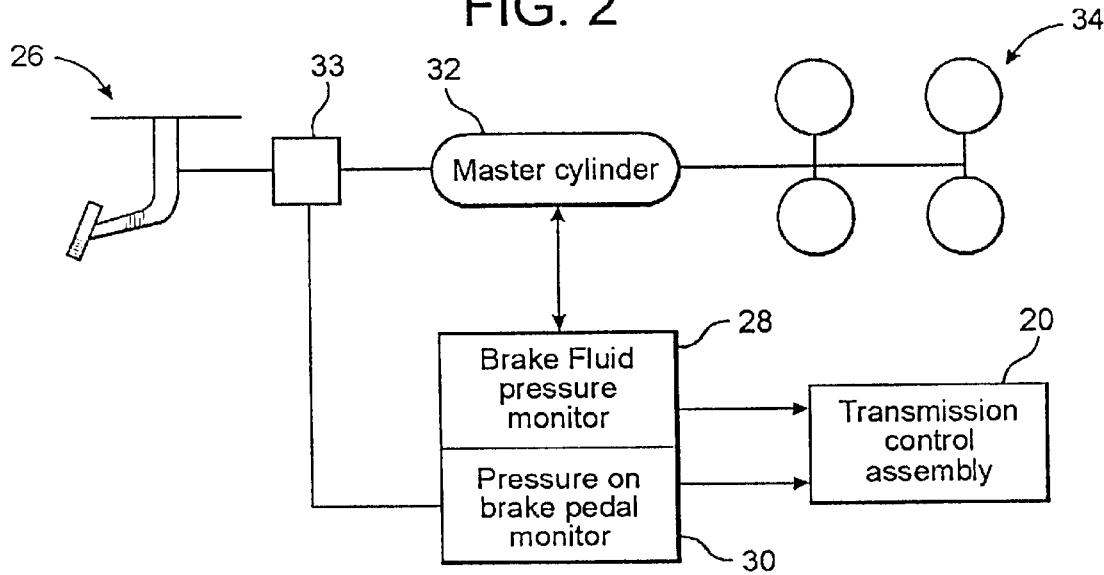
FIG. 3 is a schematic representation of yet another embodiment of the monitoring and/or sensing components of the system of the present invention associated with the braking mode.

With regard to FIG. 3, yet another preferred embodiment of the present invention comprises an alternate monitor/sensor for sensing and determining the braking condition of the vehicle and is generally represented as 28 and 30. Monitor/sensor 28 is specifically designed and structured for direct interconnection to the master cylinder 32 which houses the hydraulic fluid or "brake fluid" used to physically position the brake shoes or other braking structure associated with the plurality of wheels generally indicated as 34 of the vehicle. In conventional fashion the brake pedal 26 has a force exerted thereon, which directly serves to pressurize the brake fluid within master cylinder 32 for mechanical positioning of the brake components associated with each of the wheels 34 of the vehicle. The monitor/sensor 28 measures the increase in brake fluid and accordingly determines whether the predetermined conditions associated with the braking mode of the automobile, which define the criteria associated therewith, have been met to the extent of generating an activating signal or otherwise activating the transmission control assembly 20.

An alternate and/or supplementary monitor/sensor 30 is designed and structured to determine the amount of pressure exerted on the brake pedal 26 by the foot of the operator. The pressure, exerted on the brake pedal may be directly associated with the increase or decrease in brake fluid pressure and accordingly may serve as an adjunct to the brake fluid pressure sensor 28. Alternately, a sensor mechanism 33 may be disposed and structured to determine the pressure exerted on brake pedal 26 and may be used separate from or in conjunction with monitor/sensor 20. Moreover, it is also contemplated that a monitoring of the braking condition may be achieved by a monitoring of the physical movement by the vehicle, and/or a stop thereof, and could indeed include a monitoring of the vehicle speedometer, the speedometer typically being independent from the tachometer which measures the RPMs and thereby providing a second independent indication that a second criteria which generally relates to the vehicle actually stopping is also achieved. In any of the previous embodiments, however, when the criteria associated with the braking mode has been met, an activating signal is generated by the monitor/sensor 30 and/or through cooperative interaction between the monitor/sensors 28 and 30 and delivered to the transmission control assembly 20 for activation of the gear train of the automatic transmission 22. The transmission 22 is thereby caused to shift into or out of the neutral gear and/or lower drive gear.

Figure 4:
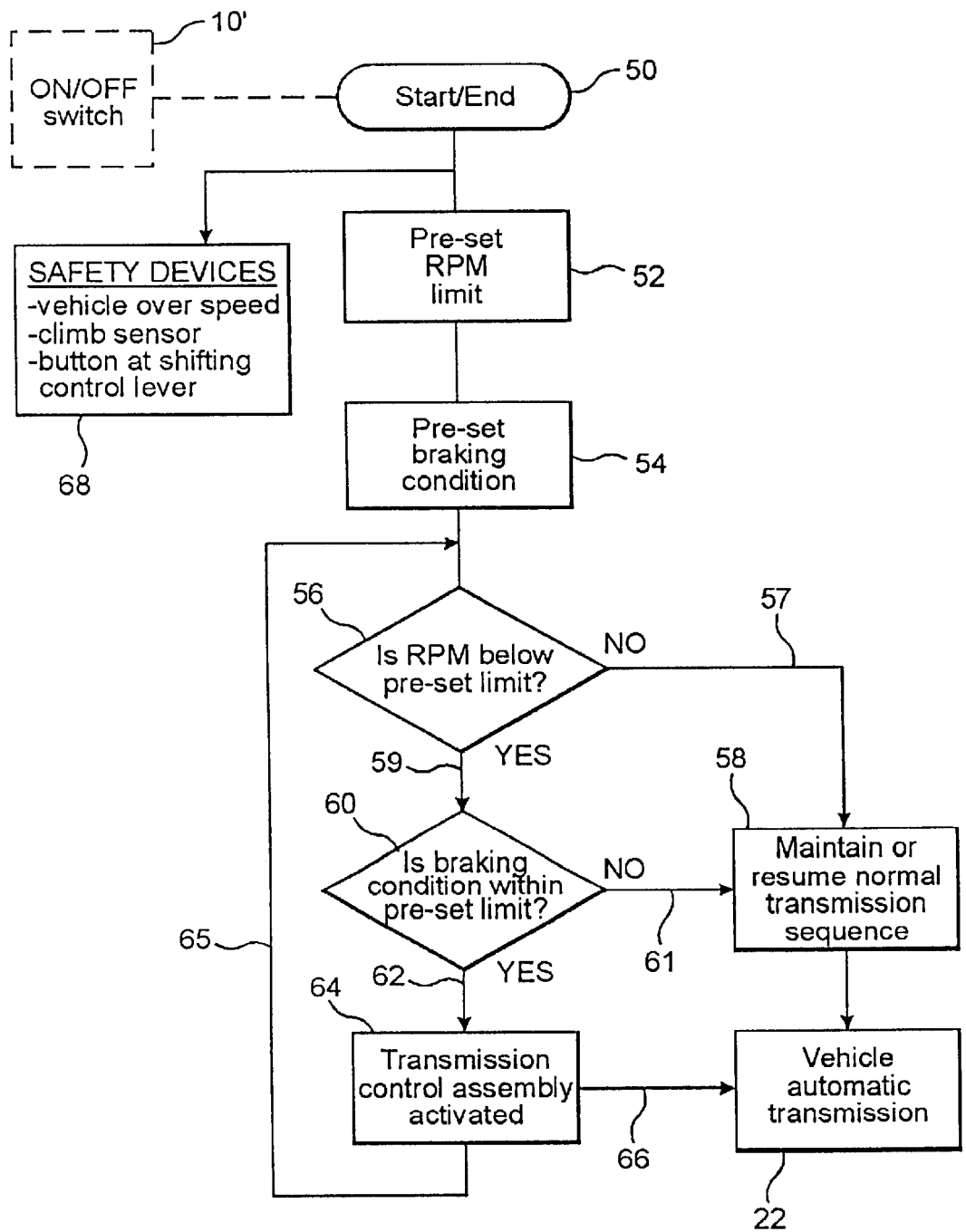
FIG. 4 is a flow diagram outlining the various steps of the attendant method of the present invention.

With reference to FIG. 4, the operation of the system of the present invention is demonstrated in the indicated steps of the attendant method. The system of the present invention is either activated or deactivated through the manipulation of the activation assembly 10 by a driver of the vehicle and/or the activation of on/off switch 10'. Accordingly, as indicated at 50 the system may be selectively activated or deactivated. Once activated, a continuous monitoring of the predetermined conditions associated with the engine speed occurs at 52. Further the monitor/sensor 12 is structured, as set forth above, to determine if certain predetermined conditions which define a first criteria are met. Namely, when the engine speed of the vehicle is preferably operating at or below a predetermined RPM, the predetermined conditions of the first criteria are met. As will be set forth in greater detail hereinafter, the monitor/sensor 12 is specifically designed and structured to continuously monitor the engine speed during activation of the system of FIG. 1. The RPM of the engine is thereby instantly and continuously determined to establish if the predetermined conditions of the first criteria are met. Similarly, a continuous monitoring and sensing of the predetermined conditions associated with the braking condition or mode of the vehicle is accomplished as at 54 to determine, at any given point, instantaneously indicating whether the braking system is engaged and proper deceleration or stopping of the vehicle has occurred. During the continuous monitoring/sensing as at 52 and 54 of both the engine speed and the braking mode respectively, a determination is first made if the predetermined conditions of the first criteria as at 56 are met. If the RPM of the engine are above the preset RPM limit the predetermined conditions of the first criteria are not met and the automatic transmission 22 is maintained and operated in a normal transmission sequence as at 57, 58. However, if the RPM of the vehicle engines are at or below a predetermined RPM as at 59 the system will next determine, or concurrently determine whether the predetermined conditions defining the second criteria, relating to the braking mode as at 60 are met. If not the automatic transmission 22 is again instructed as at 61 to operate and be maintained in a normal sequence of operation as at 58. However, if both the predetermined conditions of the first criteria 56 and the second criteria 60 are met as at 59 and 62, the gear train of the automatic transmission 22 is activated as at 64 by the transmission control assembly 20, to cause an automatic shifting from a lower drive gear to the neutral gear as at 66.

Further with regard to FIG. 4, the system and attendant method of the present invention may further include the incorporation of a plurality of safety measures including an auxiliary activation assembly 68 appropriately located on the vehicle and powered by conventional and/or mechanical power supply originating from the vehicle itself. The auxiliary activation assembly 68 may in fact incorporate a plurality of sensing and "de-activating" structures which effectively serve as safety devices for the automatic de-activation of the entire system when certain events occur or are in existence and which relate to the performance of the driver or occupant of the vehicle as well as certain driving conditions. More specifically, and as indicated in the flow diagram of FIG. 4, the various safety devices comprising the auxiliary activation assembly 68 may include means to sense the physical speed of the vehicle and are structured to de-activate the system when the vehicle speed is in excess of a predetermined limit. It is apparent that there may be situations when excessive physical speeds of the vehicle are considered to be too high to activate the system. Therefore, the automatic shifting of the vehicle into the neutral gear from a lower drive gear will be prevented, even when the first and second criteria relating to engine speed and braking mode of the vehicle are met. In addition, the auxiliary activation assembly 68 may include a sensing means structured to sense and/or determine the orientation of the vehicle, so as to automatically de-activate the system, for example when the vehicle is traveling up or down an inclined roadway or hill. Such a "climb sensor" could be structured to determine the difference in the relative heights of the front and rear axle, which will be clearly different from one another, when the vehicle is traveling up or down an incline.

The auxiliary activation assembly 68 of the present invention could further include a safety device comprising a sensing mechanism to determine either the inadvertent or intended forced movement or positioning of the shift lever, which upon occurrence would serve to automatically de-activate the system. It is contemplated that a driver, having its primary focus on the operation of driving, especially during heavy traffic conditions, could inadvertently allow the system to be activated by failure to turn the on/off switch 10' to the off position. Under such operating conditions, the driver may inadvertently contact the shift lever with sufficient force to take it out of the drive position or alternately may intentionally intend to move the shift lever to a higher or lower drive gear. Such forced engagement and/or repositioning of the shift lever, whether intentional or unintentional, would serve to automatically de-activate the system.

As set forth above, a feature of the present invention is interpreted as illustrative and not in a limiting sense. Thus, the scope of the invention should be determined by the appended claims and their legal equivalents.

Now that the invention has been described, the continuous monitoring and/or sensing of the operative characteristics of the vehicle specifically in terms of engine speed and braking mode to determine if the predetermined conditions of the first and second criteria concurrently exist or do not concurrently exist. Therefore, after the automatic transmission 22 has been shifted from the lower drive gear to the neutral gear, monitoring of the engine speed and the braking mode is continuous as at 65. In the event that either of the predetermined conditions do not exist; namely the RPM level of the engine is above the certain, predetermined RPM range as at 56 and/or the operator of the vehicle is no longer engaging the brake pedal or exerting adequate force thereon as at 60, the automatic transmission 22 is forced to resume and maintain its normal transmission sequence 58. The gear train of the automatic transmission 22 is automatically shifted from the neutral gear back to the low drive gear. Alternately, when the automatic transmission 22 has not yet been automatically shifted into the neutral gear, the automatic transmission is instructed to maintain its normal transmission sequence 58 due to the fact that the predetermined conditions associated with the first criteria 56 and/or second criteria 60 do not concurrently exist.

Since many modifications, variations and changes in detail can be made to the described preferred embodiment of the invention, it is intended that all matters in the foregoing description and shown in the accompanying drawings be

What is claimed is:

1. An engine economizing system for the motor of a vehicle comprising:
    a) a first sensing system structured to determine a vehicle engine speed,
    b) a second sensing assembly structured to determine a braking condition of a braking system of the vehicle,
    c) a transmission control assembly operatively connected to a transmission of the vehicle and structured to cause automatic shifting of the vehicle transmission only between a neutral gear and a lowest drive gear,
    d) both said first and second sensing assemblies further structured to respectively generate a first activating signal and a second activating signal upon the existence of a first predetermined condition of the vehicle engine speed and a second predetermined condition of the braking system, e) said first predetermined condition comprising the vehicle engine speed being at or below a predetermined RPM and said second predetermined condition comprising the braking condition exceeding a predetermined limit, f) said transmission control assembly being responsive to both said first and second sensing assemblies and structured to automatically shift the vehicle transmission from the lowest drive gear to the neutral gear upon receipt of both said first and second activating signals, g) said transmission control assembly further structured to automatically maintain the transmission of the vehicle in the neutral gear as long as both said first and second predetermined conditions concurrently exist, h) said transmission control assembly structured to automatically shift the vehicle transmission back from the neutral gear only to the lowest drive gear when either of said first and second activating signals are not received, and i) said transmission control assembly further structured to prevent automatic shifting back from the neutral gear to the lowest drive gear when the vehicle transmission is first manually shifted and not automatically shifted into the neutral gear.

2. A system as recited in claim 1 wherein said second sensing assembly is structured to determine a position of a brake pedal upon activation of the vehicle braking system and said second predetermined condition is at least partially defined by said brake pedal being depressed below a predetermined height.

3. A system as recited in claim 1 wherein said second sensing assembly is structured to determine a brake fluid pressure during activation of the vehicle braking system and said second predetermined condition is at least partially defined by said brake fluid pressure rising above a predetermined level.

4. A system as recited in claim 1 wherein said second sensing assembly is structured to determine pressure exerted on a brake pedal upon activation of the vehicle braking system and said second predetermined condition is at least partially defined by said pressure exerted on said brake pedal exceeding a predetermined level.

5. A system as recited in claim 1 further comprising an actuation assembly structured to selectively actuate or de-actuate said shifting system upon manual operation thereof.

6. A system as recited in claim 5 further comprising an auxiliary activation assembly structured to sense an orientation of the vehicle and automatically de-activate said shifting system dependent on predetermined vehicle orientation parameters.

7. A system as recited in claim 5 further comprising an auxiliary activation assembly structured to sense physical movement of a shift lever of the vehicle and automatically de-activate said shifting system dependent on predetermined shift level position parameters.

8. A system as recited in claim 5 further comprising an auxiliary activation assembly structured to sense the physical speed of the vehicle and automatically de-activate said shifting system dependent on predetermined vehicle speed or parameters.

9. An engine economizing motor vehicle shifting system comprising:

a) a first sensing assembly structured to determine a vehicle engine speed, b) a second sensing assembly structured to determine the vehicle braking mode, c) a transmission control assembly operatively connected to the vehicle transmission and structured to cause shifting of the vehicle transmission between a neutral gear and a drive gear, d) both said first and second sensing assemblies further structured to respectively generate a first activating signal and a second activating signal upon the existence of a first predetermined condition of said engine speed and a second predetermined condition of said braking mode, e) said transmission control assembly being responsive to both said first and second sensing assemblies and structured to automatically shift the vehicle transmission from the drive gear to the neutral gear upon receipt of both said first and said second activating signals, f) said transmission control assembly structured to automatically shift the vehicle transmission back from the neutral gear to the drive gear when either of said first and second activating signals are not received, and g) said transmission control assembly further structured to prevent automatic shifting back from the neutral gear to the drive gear when the vehicle transmission was first manually shifted and not automatically shifted into the neutral gear.

10. A method of economizing operation of a vehicle engine and minimizing wear on a vehicle transmission, said method comprising the steps of:

a) sensing an engine speed of a vehicle powered by the vehicle engine;

b) determining if the engine speed is at or below a predetermined RPM;

c) sensing a braking condition of a braking system of the vehicle;

d) determining if the braking condition exceeds a predetermined limit including identifying an extent to which the braking system is activated;

e) shifting the vehicle transmission automatically from a lowest drive gear to a neutral gear when both the engine speed is at or below the predetermined RPM and the braking condition exceeds the predetermined limit;

f) automatically maintaining the vehicle transmission in the neutral gear as long as both the engine speed is at or below the predetermined RPM and the braking condition exceeds the predetermined limit;

g) shifting the vehicle transmission automatically back from the neutral gear only to the lowest drive gear when either the engine speed exceeds the predetermined RPM or the braking condition is less than a predetermined limit, and h) shifting the vehicle transmission automatically from the neutral gear only to the lowest drive gear if the vehicle transmission was first automatically shifted into the neutral gear due to the occurrence of both the engine speed being at or below the predetermined RPM and the braking condition exceeding the predetermined limit.

11. A method as recited in claim 10 wherein the step of identifying the extent to which said braking system is activated further comprises determining if a brake pedal of the braking system is below a predetermined height.

12. A method as recited in claim 10 wherein the step of identifying the extent to which said braking system is activated further comprises determining if a brake fluid pressure of the braking system is above a predetermined level.

13. A method as recited in claim 10 further comprising selectively adjusting the predetermined RPM.

* * * * *